Aug. 3, 1965 I. W. BEMIS ETAL 3,198,684

SNAP FASTENER ATTACHING APPARATUS

Filed Dec. 21, 1959 5 Sheets-Sheet 1

INVENTORS:
IRVING W. BEMIS,
GORDON W. RICHMOND,
FREMONT H. NELSON,
BY Walter S. Jones
ATTORNEY.

SNAP FASTENER ATTACHING APPARATUS
Filed Dec. 21, 1959 5 Sheets-Sheet 2
FIG. 5.
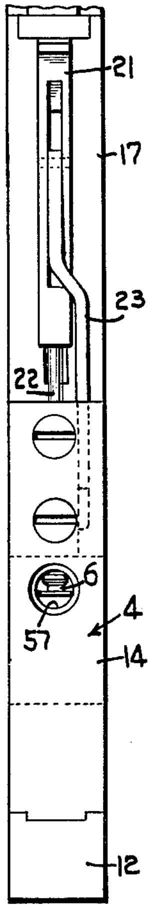
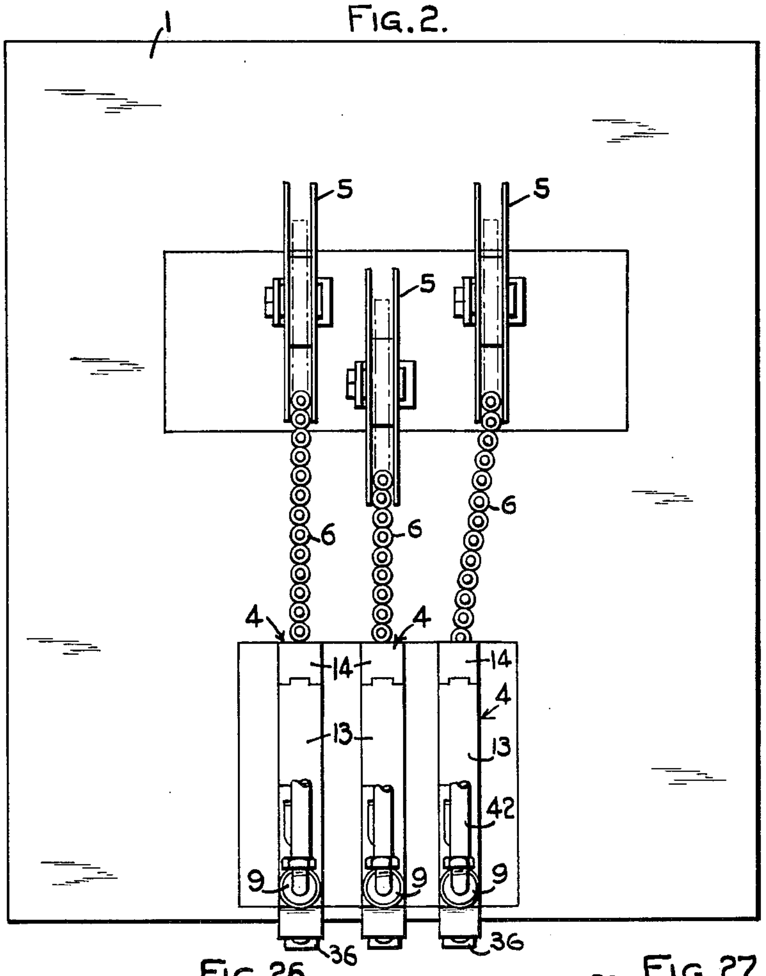
FIG. 26.
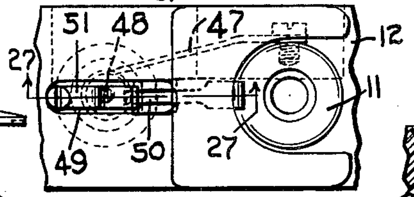
FIG. 27.
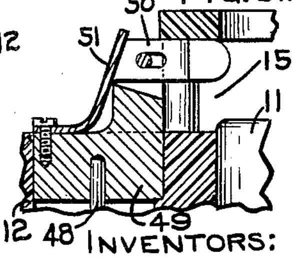
FIG. 7.
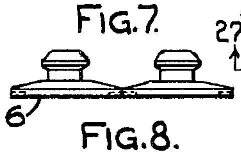
FIG. 8.
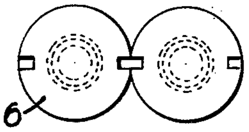
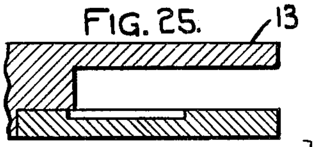
INVENTORS:
IRVING W. BEMIS,
GORDON W. RICHMOND,
FREMONT H. NELSON,
BY Walter S. Jones
ATTORNEY.

INVENTORS:
IRVING W. BEMIS,
GORDON W. RICHMOND,
FREMONT H. NELSON
BY Walter S. Jones
ATTORNEY Aug. 3, 1965 I. W. BEMIS ETAL 3,198,684

SNAP FASTENER ATTACHING APPARATUS

Filed Dec. 21, 1959 5 Sheets-Sheet 4

INVENTORS:
IRVING W. BEMIS,
GORDON W. RICHMOND,
FREMONT H. NELSON,
BY Walter S. Jones
ATTORNEY.

SNAP FASTENER ATTACHING APPARATUS

Filed Dec. 21, 1959 5 Sheets-Sheet 5

INVENTORS:
IRVING W. BEMIS,
GORDON W. RICHMOND,
FREMONT H. NELSON,
BY Walter S. Jones
ATTORNEY.

3,198,684

SNAP FASTENER ATTACHING APPARATUS

Irving W. Bemis, Natick, Gordon W. Richmond, Whitman, and Fremont H. Nelson, Sharon, Mass., assignors to United-Carr Incorporated, a corporation of Delaware Filed Dec. 21, 1959, Ser. No. 3,976
1 Claim. (Cl. 156—518)

Our invention aims to provide improvements in apparatus for attaching snap fastener and similar parts to any suitable supporting member and is directed primarily to an improved mechanism for feeding and applying molded plastic snap fastener studs and/or sockets to a support preferably by the use thereof in conjunction with a high frequency generator so that the parts may be heat sealed to the support.

An object of our invention is to provide an attaching mechanism with a new, useful, simple, inexpensive and positive acting mechanism for feeding one or more parts to be applied to a support and which mechanism includes a rotating means associated with a reciprocable means which cooperate with suitable apparatus by which a molded part may be heat sealed to a suitable supporting member.

Another object of our invention is to provide an improved setting mechanism having upper and lower tools and means cooperating to feed a strip of fastener members, separate one fastener member from the strip, pick up the separated fastener member from a moveable support, and then press the removed fastener member against a supporting member held between the upper and lower tool whereby the fastener member may be attached as desired.

A further object of our invention is to provide a simple fastener member applying mechanism that includes positive action rotating feeding means to move a strip of molded plastic fasteners, a fastener pick up reciprocable tool for holding the fastener member, and associated means for rotating the rotating member on conjunction with movement of the reciprocable tool and means for supporting a fastener member, on the end of the strip, while it is being separated from the strip and picked up by an attaching tool.

Referring to the drawings which illustrate a preferred embodiment of our invention, we have illustrated our invention in connection with a heat sealing machine, parts of the machine being shown more or less schematically while our invention is shown in detail.

In the drawings:

FIG. 2 is a plan view of FIG. 1 with the air supply tubes broken away;

FIG. 5 is a rear view of the head shown in FIG. 3 with more of the air cylinder omitted;

FIG. 7 is an enlarged side elevation of two joined snap fastener studs of a strip that may be fed and applied by our improved mechanism;

FIG. 8 is a bottom plan view of the studs shown in FIG. 7;

FIG. 25 is a section taken on the line 25—25 of FIG. 3 showing only the housing formation for the rotatable fastener strip feeding mechanism;

FIG. 26 is a plan view of the lower attaching member as viewed from the line 26—26 of FIG. 3 and also shows the electrical contact wiring; and FIG. 27 is a section taken on the line 27—27 of FIG. 26.

Figure 1:
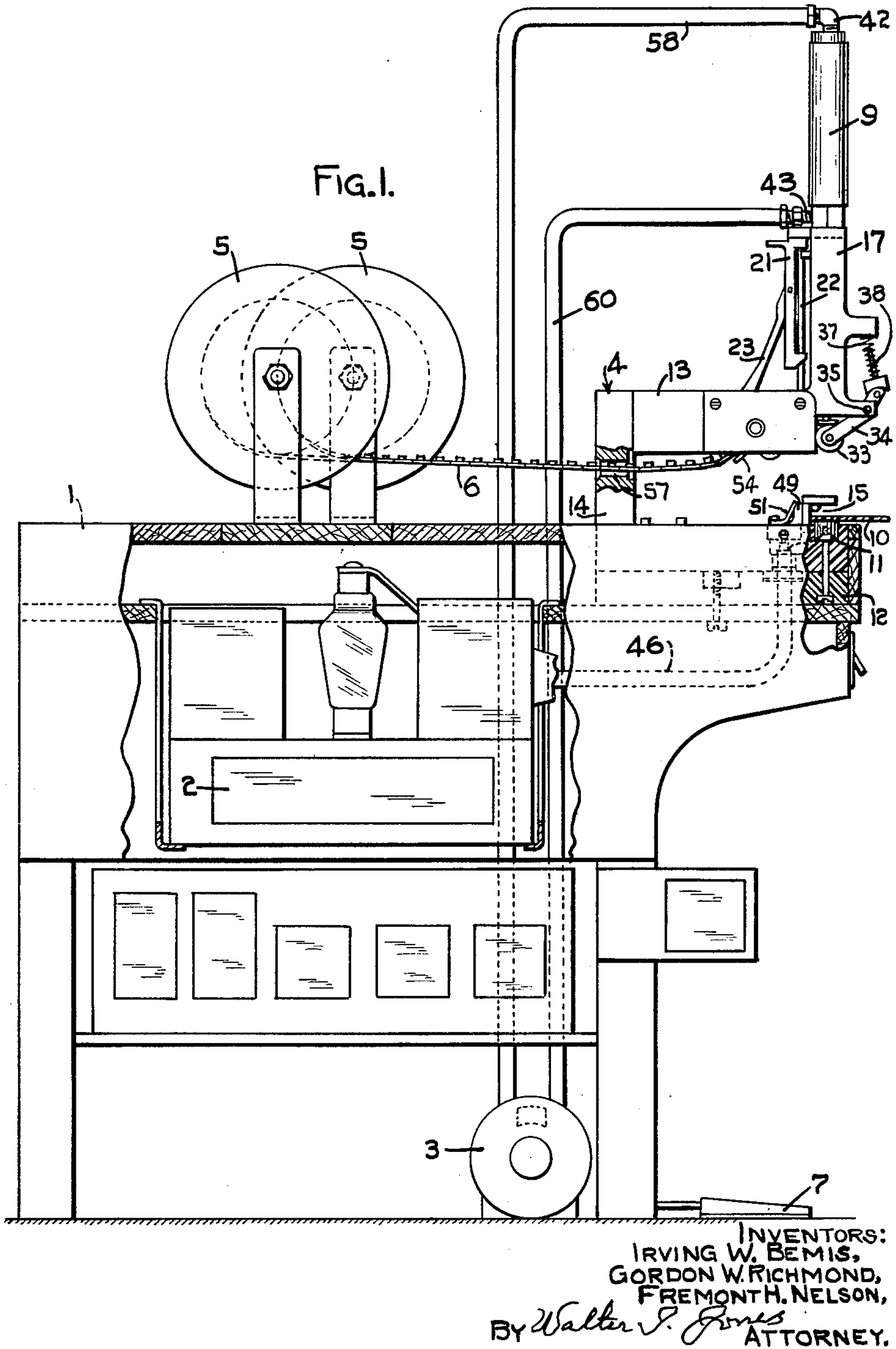
FIG. 1 is a side elevation of a machine, partly in section, partly broken away and somewhat diagrammatic to disclose our invention.

Our invention, as illustrated in the drawings, relates to an improved mechanism as a part of a machine for attaching a snap fastener member (preferably of heat sealable plastic material) to a suitable article of commerce. It should be understood that our improved mechanism may be used with any suitable basic heat sealing machine and apply equally to a single headed machine or a machine with a plurality of attaching heads. We have shown a machine with three attaching heads that would be suitable for attaching three snap fastener members at a time to an edge of a baby pants.

Before describing our invention in detail, it seems advisable to describe a more or less complete machine and its operation in general.

It is our aim to provide a simple, inexpensive, positively operated mechanism, as a part of a so-called heat sealing machine whereby heat sealable devices such as snap fastener members, may be fed, preferably in strip form, through our improved feeding and applying mechanism which we call the head of the machine. We have, therefore, shown in the drawings, a basic machine which includes a base 1 in which is mounted a suitable heat sealing generator 2, which may be of the high frequency type. The base 1 also houses an air compressor 3. On the base 1 we have mounted suitable attaching head units 4 of our invention and there may be one or more of these heads depending upon the desired use of the machine. As stated before, we have shown in the drawings three heads 4 so that the fastener members may be applied three at a time when desired.

The base 1 also supports supply reels 5 of strip fastener members (in this case snap fastener studs 6). When an operator presses the foot pedal 7 (after snapping on suitable switches controlling the flow of power to the generator 2 and the air compressor 3) the electrical part of the apparatus goes into operation and at the same time the apparatus that supplies compressed air to the upper tool 8 through the cylinder 9 is set in motion. With the article of commerce 10 inserted between the upper tools 8 and the lower tools 11, snap fastener studs (or other similar devices) are picked up by the upper tools 8 and moved against the article of commerce and are pressed between the upper tools 8 and the lower tools 11 where the heat sealing takes place. This operation will be clearly understood by those skilled in the art without going into detail as to the construction and operation of the general parts of the machine.

Referring now to one of our improved attaching heads 4, we have illustrated (FIGS. 1 and 3) a head 4 that is in the nature of a preassembled unit suitably secured in a desired position on the top of the base 1. This unit has a bottom portion 12 (preferably of insulating material) and an upper portion 13 (preferably of metal) connected in spaced relation by a post 14 to provide a work receiving throat 15. The bottom portion 12 supports a lower fixed tool 11 and the upper portion 13 has a housing 17 that supports an upper reciprocable member 18.

We are aware of the fact that a strip of heat sealable fastener elements heretofore has been fed to upper and lower attaching tools but there has been a great deal of difficulty in feeding the strip properly and in removing a fastener part from the strip into position in the upper tool. These troubles have been overcome by our improved mechanism which we will now describe in detail.

In the upper portion 13 of our improved unit we have mounted a rotating device including a reel 19 (FIGS. 3, 6, 21 and 22) mounted on a more or less standard type of clutch roller 20 supported by the upper portion 13.

Figures 3, 4, 11:
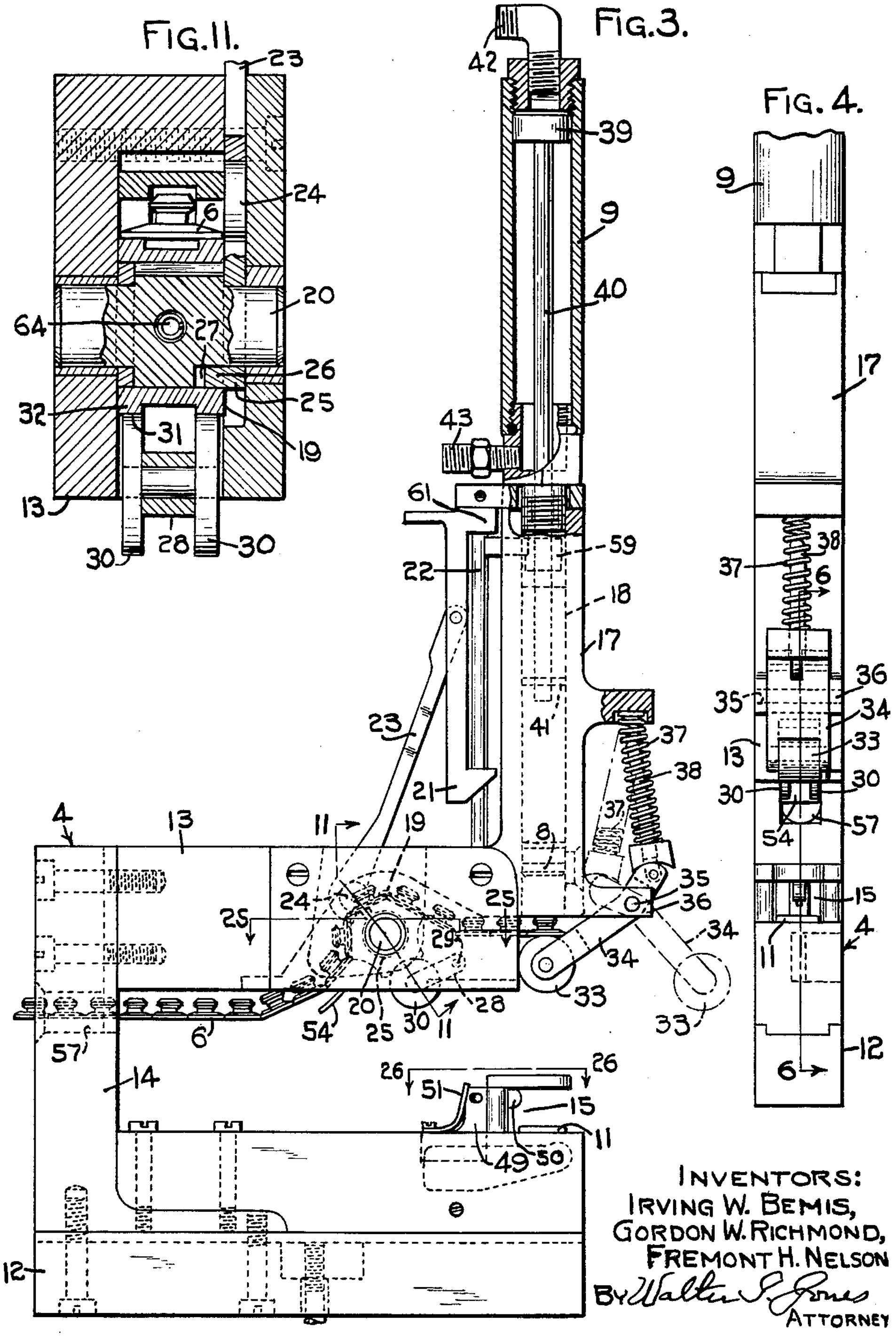
FIG. 3 is a side view of one of the attaching heads of the machine showing the main features of our invention.
FIG. 4 is a front view of the head, shown in FIG. 3, with the upper part of the air cylinder broken away.
FIG. 11 is an enlarged section taken from the line 11—11 of FIG. 3 showing the rotatable fastener strip feeding mechanism.
Figures 9, 10, 12, 13, 14, 15, 16, 17, 18:
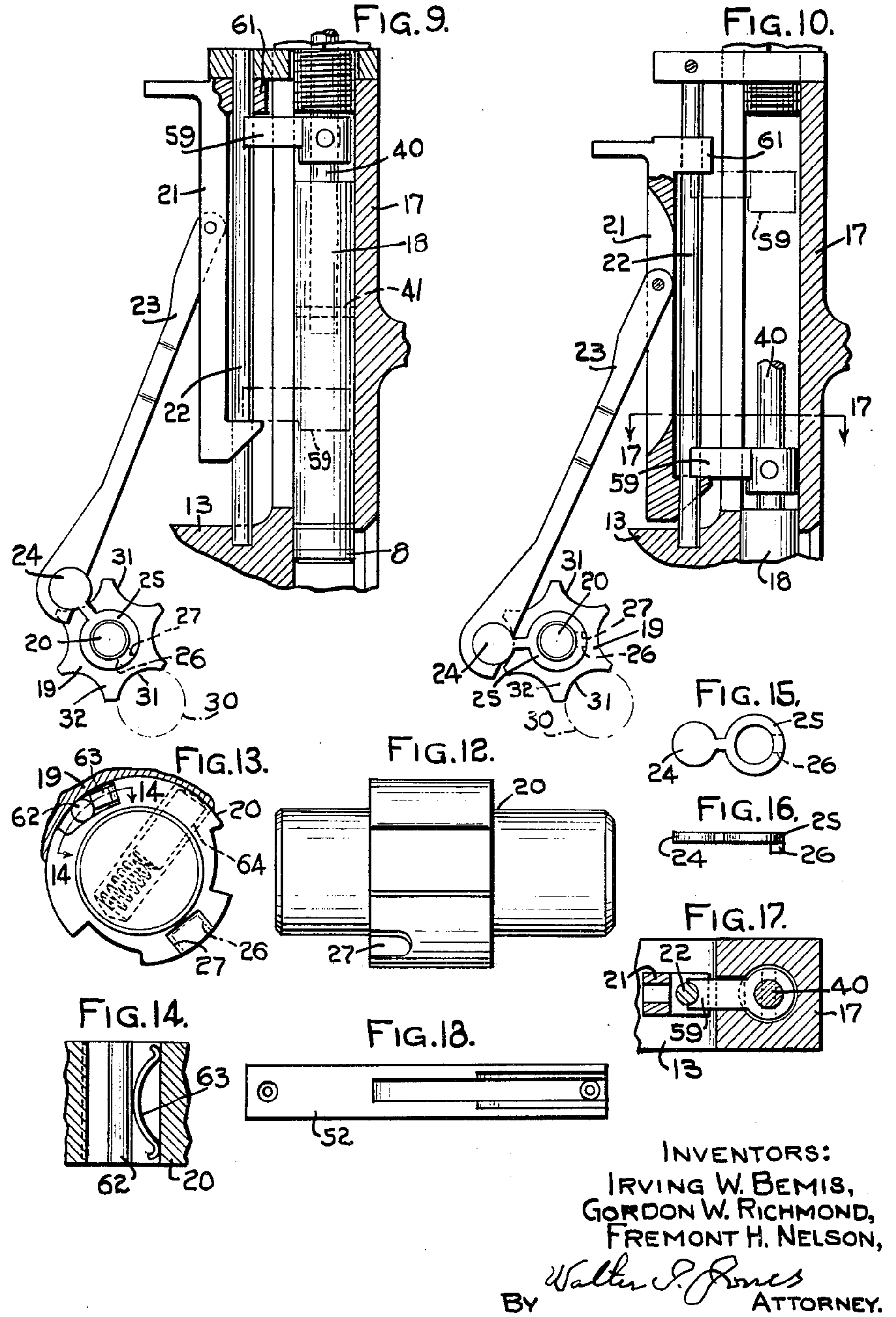
FIG. 9 is a section of a portion of the upper attaching member in raised position.
FIG. 10 is a section similar to FIG. 9 with the attaching member mechanism in its lowest position and with the attaching tool omitted.
FIG. 12 is an elevational view of a clutch device of the fastener feeding mechanism.
FIG. 13 is an end view of the clutch device shown in FIG. 12 with a sectional portion of the reel to show operation of clutch.
FIG. 14 is a section taken on the line 14—14 of FIG. 13 to show one of the clutching rollers of the clutching device.
FIG. 15 is a plan view of a clutch rotating link.
FIG. 16 is an edge view of the link shown in FIG. 15.
FIG. 17 is a section taken on the line 17—17 of FIG. 10.
FIG. 18 is a bottom plan view of the upper fastener strip guide shown in FIG. 6 to assist in guiding the strip of fasteners past the rotatable fastener feeding mechanism.

In order that the reel 19 may be rotated the exact distance to feed the strip of fastener studs, we have provided a feeding mechanism operable by movement of the mechanism that reciprocates the upper member 18. This mechanism includes a hook line member 21 (FIGS. 1, 3, 9 and 10) mounted for up and down movement upon a rod 22 and an arm 23 pivoted on the hook like member 21 at one end and moveably connected at its other end to one end 24 of a clutch rotating link 25 suitably mounted on and connected to the clutch 20 by a lug 26 engaged in a slot 27 (FIGS. 9, 10 and 11). As a means of positive rotation of the reel 19, a predetermined distance, when operated by the hook like member 21 and arm 23, we use a spring actuated double wheel device 28 mounted on a pivot 29 (FIGS. 3, 6, 11 and 19). This wheel device 28 has round edge wheels 30 normally engaged in cooperatively shaped scallops 31 provided in the flanges 32 of the reel 19, thereby positively causing the reel 19 to come to rest at a predetermined point of rotation, even though the operating means for the reel may vary slightly in its motion.

We have provided a simple device for supporting a snap fastener stud when it is fed into the path of the upper tool 8. This device includes a roller 33 rotatably mounted on a yoke like member 34 (FIGS. 3, 6 and 20) which in turn is mounted upon a pivot pin 35 supported by a bracket 36 on the housing 17 for the upper reciprocating member 18. A spring 37 supported upon a rod 38 pivoted to the yoke like member 34 normally presses the roller 33 toward a position beneath the tool 8 to support a plastic stud fastener member, as shown in FIGS. 3 and 20.

While any suitable means may be used to move the reciprocable member 18 up and down in its housing 17, we have shown an air cylinder 9 (FIGS. 1 and 3) mounted at the upper end of the housing 17. This cylinder 9 contains a piston 39 connected, through the piston rod 40, to the reciprocating member 18 by a pin 41. The piston 39 is operated by compressed air admitted at one end of the cylinder 9 through a tube 42 and also admitted at the other end through a tube 43. The reciprocating member 18 is preferably made up of several pieces. At the lower end is the tool member 8 constructed to receive and hold the part to be attached. In this instance the tool has a bore 44 for receiving the head of the snap fastener stud and there is a yieldable stud holding device 45 mounted in the bore 44, as best shown in FIG. 6. The tool 8 is of metal for conducting electrical energy and the reciprocable tool holding member 18 is of insulated material, the reason for which is obvious.

Figures 6, 19, 20, 21, 22, 23, 24:
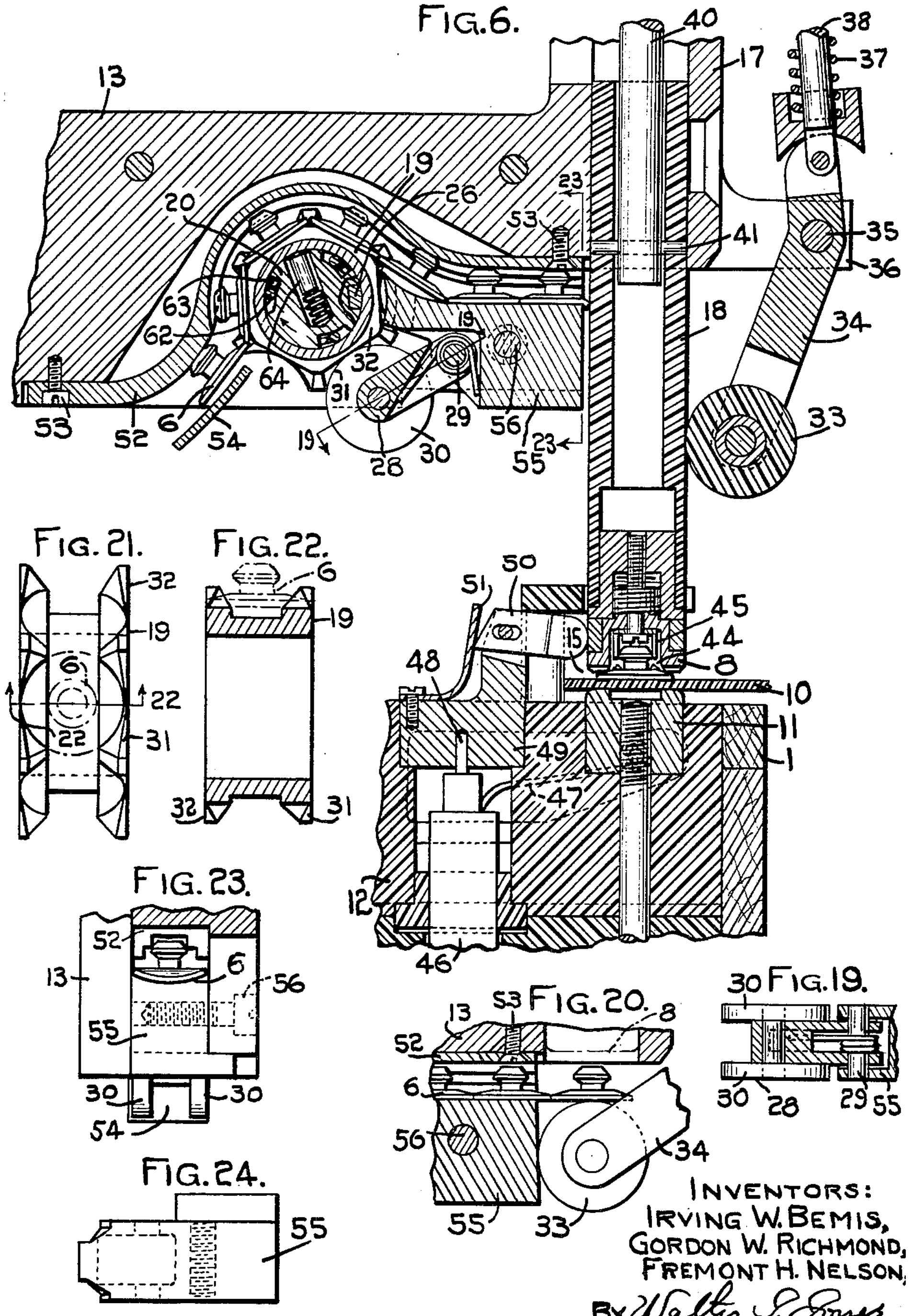
FIG. 6 is an enlarged section taken on the line 6—6 of FIG. 4 with the mechanism in sealing position.
FIG. 19 is a section taken on the line 19—19 of FIG. 6.
FIG. 20 is a section of the parts adjacent to the fastener supporting member below the upper fastener attaching tool.
FIG. 21 is an edge view of the fastener feeding reel, of the rotatable fastener strip feeding mechanism.
FIG. 22 is a section taken on the line 22—22 of FIG. 21 with a snap fastener stud shown in dotted lines.
FIG. 23 is a section taken on the line 23—23 of FIG. 6 adjacent to the fastener pick up point.
FIG. 24 is a plan of a fastener strip guide block shown in section in FIG. 6.

The lower tool 11 is of metal and connected to one end of a coaxial cable 46, supplying power from the generator 2 by lead end 47, as shown in FIG. 6. The other lead end 48 of the cable 46 is connected to a special contact device which includes a block 49 of metal, an upper tool contacting member 50, pivoted to the block 49, and a leaf spring 51 (FIGS. 6, 26 and 27). This device is connected to the power supply by the lead end 48 which is engaged directly with the block 49, as shown in FIG. 6. The operation of the lower tool and its associated electrical means will be described in more detail later.

As best shown in FIG. 6, the upper portion 13 of a head 4 is hollowed (FIGS. 6, 11 and 25) to receive the rotating reel 19 and provide a space through which the fastener strip may be guided and fed. An upper guide 52 is attached in position by screws 53—53 and it is bent to a shape which fits around the reel 19. A bottom plan view of this guide 52 is shown in FIG. 18. Associated with the guide 52 is another small entering guide 54 welded or otherwise secured to the upper portion 13. A guide block 55 is also secured by a screw 56 (FIG. 6) adjacent to the inner end of the line of feed. This block 55 is also shown in detail in FIGS. 23 and 24 and it should be noted that the wheel device 28 is pivoted to the block 55, see FIG. 19.

We will now describe a complete operation of our invention in connection with a heat sealing machine having a high-frequency electronic generator and an air compressor mounted in a suitable manner in connection with a suitable stand or table. First, the operator feeds the continuous strip or strips of studs 6 (molded or heat sealed together) by hand to the head or heads 4 through holes 57 in the posts 14 (FIG. 1) then up through the space provided between the guides 52 and 54 (FIG. 6) until the end stud of each strip is under the upper reciprocable tool or tools 8 and then the roller or rollers 33 are snapped from the dotted position (FIG. 3) to the full line position where they support the stud members.

Now the operator places the article 10 over the lower tool 11 and then steps upon the foot switch 7 as best shown in FIG. 1. The high frequency generator 2 and the air compressor 3, that have been previously put into operation by suitable switches connected to electric power supply and not shown, are now operated and compressed air is admitted to the air tube 42 at the upper end of the air cylinder 9 from the supply pipe 58. Air then moves the piston 40 downwardly in the cylinder 39, thereby moving the upper tool 8, the fastener stud 6 and the roller 33. The stud 6 is entered into the bore 44 of the tool 8 and, as the tool continues downwardly, the head of the stud is grasped by the fastener holding device 45 and the stud flange is pulled free from engagement with the stud flange of the next fastener of the strip, as shown in FIG. 6. As the upper tool 8 continues its downward movement, the roller 33 is swung out of the way, by the tool 8, and slides along the outside surface of the reciprocating member 18, as also shown in FIG. 6. As the tool engages the article 10, it and the stud 6 are pressed against the lower tool 11 and electrical contact is made with the metal outer surface of the tool 8 by the tool contacting member 50 so that the circuit is completed to allow high frequency electrical energy to heat seal the stud to the article 10 as will be understood by those skilled in the art.

During the downward movement of the upper tool 8, a latch member 59, carried by the piston rod 40, moves from a position shown in FIG. 9 to a position shown in FIG. 10, thereby engaging the hook like member 21. During this movement the hook member is moved downwardly, thereby causing the arm 23 to move and in turn move the link 25, thereby rotating the clutch 20 inside the rotating reel 19 without moving the reel.

After the seal of the stud 6 to the article 10 is completed, the air controlling apparatus (not shown) admits compressed air into the pipe 60 where it passes to the lower side of the piston 39 through the tube 43, thereby moving the piston upwardly in the air cylinder 9. During this movement the upper tool 8 and the roller 33 return to their normal positions as shown in FIG. 3.

The latch 59 moves upwardly with the piston rod 41 and during this travel, engages a projection 61 on the upper end of the hook like member 21 at a point shown in dotted lines in FIG. 10 and then as the movement continues, the hook like member 21 is moved upwardly to the position shown in FIGURE 9. The arm 23 is thereby pulled upwardly in turn rotating the clutch 20, which this time grips the reel 19 and through the medium of the rollers 62 and spring 63 in the usual manner of this type of clutch, thereby turning the reel 19 a predetermined distance. It will be noted that the roller 62 engaging surfaces on the clutch 20 are slightly curved (rather than straight) because it is found that on a small diameter clutch a curved surface works better, as shown in FIG. 13. This distance is the amount necessary to move the strip of studs 6 far enough to place the necessary stud over the roller 33 in the path of movement of the upper tool 8. As the reel 19 turns, the wheel device 28 is operated and the roller 30 moves from one scallop 31 to the next in the flange 32 of the reel 19. As stated before, this positively controls the movement of the rotating feeding mechanism to the proper degree of the fastener strip. The clutch also carries a spring pressed pin 64 (preferably of tough plastic material) to provide a brake means bearing against the reel 19 (FIGS. 6 and 13) to assist in smooth operation of the reel when the clutch is operated.

If necessary, adjustment of this positioning wheel device may be taken care of by any suitable means, but we prefer to provide for adjustments by substitution of wheel supporting members of different lengths.

Some of the detail parts shown by some of the figures of the drawings illustrate parts used in our invention and were added to the drawings to aid those skilled in the art in understanding our invention without the necessity for detailed description of exact constructions because the parts may vary according to the drawings without departing from our invention.

Our invention, as illustrated by the drawings and described above, relates to a mechanism that we have actually constructed, tested and operated over a period of time and found satisfactory for its intended uses. However, we do not wish to be limited by our preferred disclosure as our invention is best defined, as to scope, by the following claim.

We claim:

Feeding and attaching apparatus for securing elements to a support material comprising a lower support member, a fixed tool member secured adjacent the forward free end of the lower support member for receiving the support material thereon, an upper support member lying in vertically spaced, substantially parallel relationship to said lower support member and having a discharge opening at the forward free end thereof through which fastener elements will pass, a vertical housing member secured at its lower end to the forward free end of said upper support member immediately above said discharge opening and extending upwardly from said upper support member in substantially right angle relationship thereto and in substantially vertical alignment with said fixed tool member and being in vertically spaced relationship thereto, a vertical reciprocable tool member positioned within said housing member with the bottom actuating end thereof normally lying within said housing, means associated with said reciprocable tool member to effect the desired vertical movement thereof, rotatable fastener element strip-feeding means mounted on said upper support member for discharging fastener elements in a horizontal plane through said discharge opening in the forward end of said upper support member at a point just below the lower end of said vertical housing member and into the path of and in engagement with the actuating head of said vertically reciprocable tool member at the beginning of its downward stroke, a movable fastener element supporting member pivotally mounted to said vertical housing and having a portion normally lying just below the passageway of said upper support member to support a fastener element against the lower end of the tool after same has been placed in the path of the tool and movable out of the way of said tool after the fastener element has been picked up by said reciprocating tool member at the beginning of its downward stroke, and means associated with said vertical housing member and said feeding means for the indexing of said feeding means upon the vertical movement of said reciprocable tool to place a fastener element into the path of and in engagement with said reciprocable tool member on the beginning of its downward stroke to apply same to the supporting material.

References Cited by the Examiner

UNITED STATES PATENTS

| | | | |
|---|---|---|---|
| 1,745,581 | 2/30 | Olgay | 1—2.4 |
| 2,534,360 | 12/50 | Loverch | 218—6 |
| 2,941,576 | 6/60 | Schenkengel | 154—42 |

EARL M. BERGERT, *Primary Examiner.*

CARL F. KRAFFT, ALEXANDER WYMAN, JOSEPH REBOLD, *Examiners.*